(No Model.) 2 Sheets—Sheet 2.

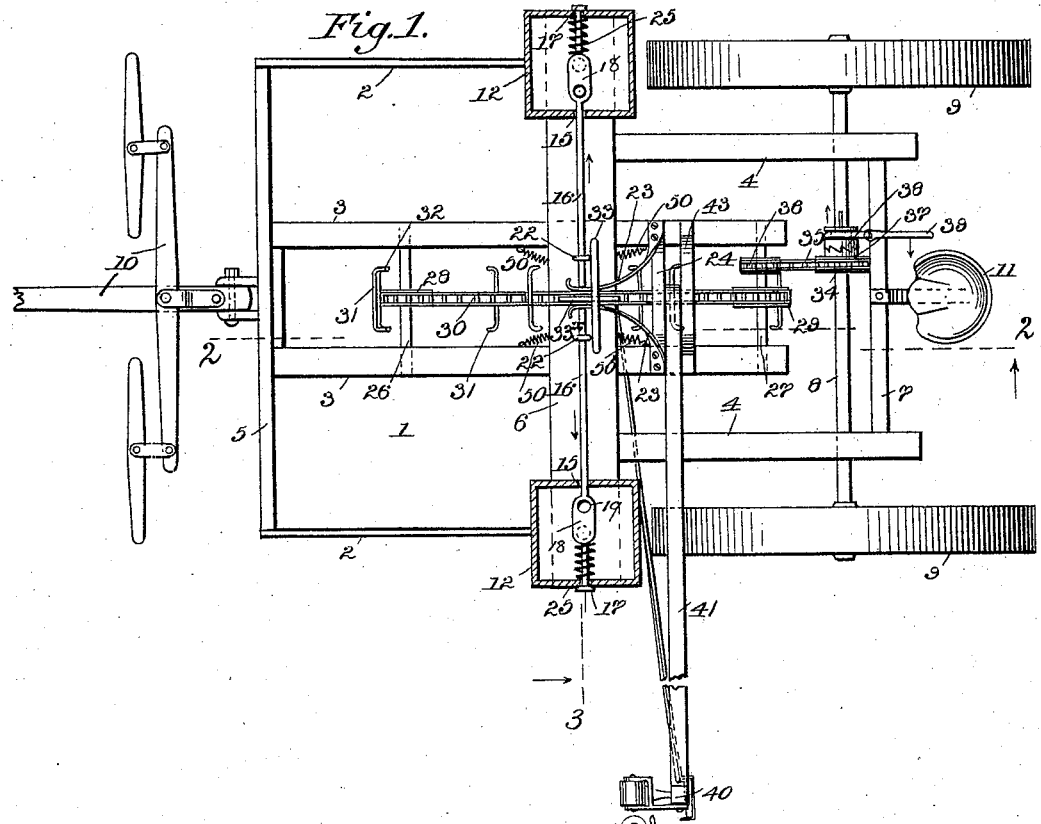

W. S. EYSTER.
CORN PLANTER.

No. 576,065. Patented Jan. 26, 1897.

Attest:
F. H. Schott
Edward Weaver

Inventor
William S. Eyster
By W. H. Ruff

UNITED STATES PATENT OFFICE.

WILLIAM S. EYSTER, OF OTTAWA, ILLINOIS, ASSIGNOR OF ONE-FOURTH TO JASON F. RICHARDSON, JR., AND BEN F. BRADY, OF SAME PLACE.

CORN-PLANTER.

SPECIFICATION forming part of Letters Patent No. 576,065, dated January 26, 1897.

Application filed November 19, 1895. Serial No. 569,478. (No model.)

*To all whom it may concern:*

Be it known that I, WILLIAM S. EYSTER, of Ottawa, in the county of La Salle and State of Illinois, have invented certain new and useful Improvements in Corn-Planters; and I do hereby declare the following to be a full, clear, and exact description of the invention, such as will enable others skilled in the art to which it appertains to make and use the same.

My invention relates to improvements in corn-planters, the objects being to provide improved mechanism for discharging the corn from the boxes or hoppers, to substitute marking devices of novel construction for the well-known check-row attachments, and generally to improve the efficiency of this class of machines.

The invention consists in the features of construction and combinations of parts hereinafter fully described, and specifically set forth in the appended claims.

Figure 3:
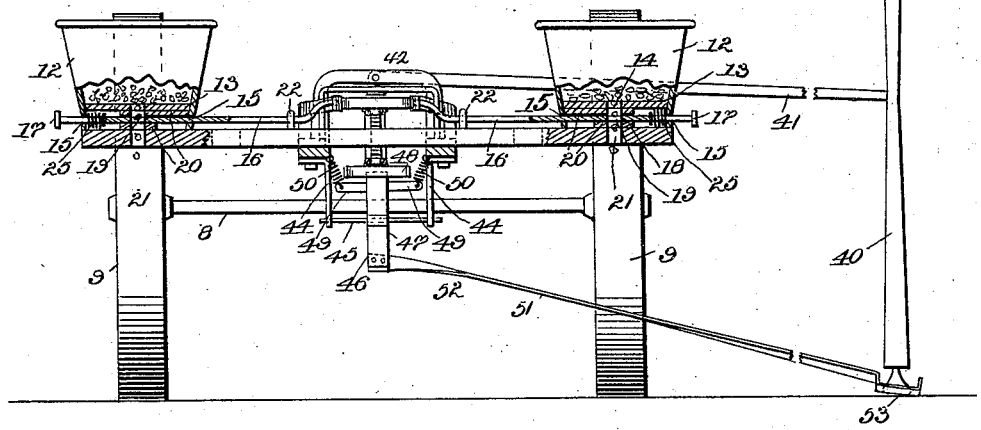
Figure 4:
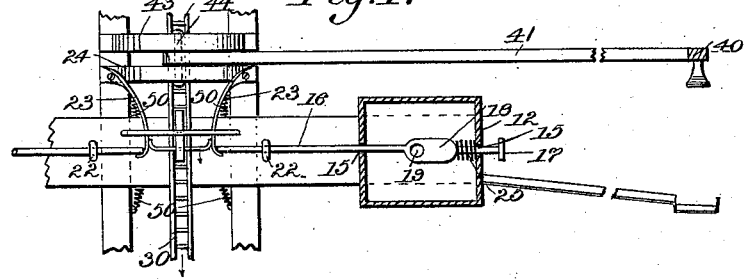
Figure 5:
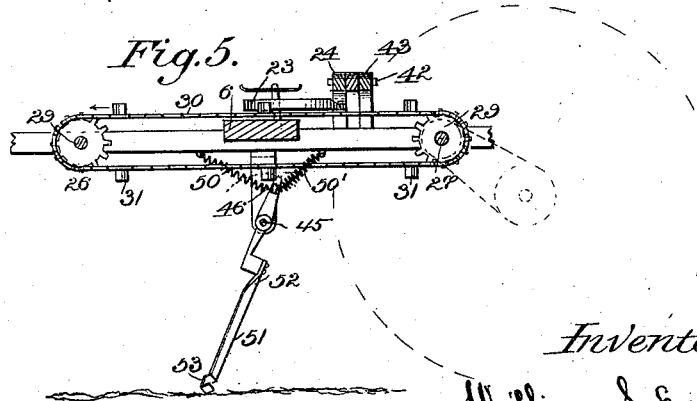

In the accompanying drawings, Figure 1 is a plan view of a machine embodying my improvements. Fig. 2 is a longitudinal vertical section on the line 2 2 of Fig. 1. Fig. 3 is a transverse section on the line 3 of Fig. 1. Fig. 4 is a detail plan view showing the dropping-arms and their operating devices on an enlarged scale, and Fig. 5 is a sectional detail view more clearly illustrating the marking devices.

The reference-numeral 1 indicates the frame of the machine, comprising parallel longitudinal bars 2, 3, and 4, front cross-bar 5, central cross-bar 6, and rear cross-bar 7. 8 indicates the axle of the machine, upon which are mounted the wheels 9. Draft devices 10 are connected to the front cross-bar 5, and a seat 11 is supported upon the rear cross-bar 7. These several features may be of any preferred construction, since they constitute no part of my invention except in combination with the novel features now to be described.

At each end of the central cross-bar 6 is arranged a seedbox 12, provided with a bottom 13, having an opening 14, through which the corn drops, and with lateral slots 15, through which the reciprocating rods 16 extend. Each of the rods 16 is provided at its outer end with a head or stop 17 and a perforated flattened portion 18, the latter constituting slides operating within the box. The openings 19 in said slides are adapted to register with the openings 14 in the boxes when the rods are forced outwardly. Below each of the bottoms of the boxes 12 are arranged parallel guides 20, between which the slides 18 play, said guides having openings registering with the openings 14 of the boxes and openings 21 in the central cross-bar 6. The inner ends of the rods 16 are supported by keepers 22, projecting upwardly from the central cross-bar 6, and between said inner ends of the rods 16 are arranged diverging springs 23, the rear ends of which are secured to an arched cross-bar 24, connecting the bars 3 3, and then bent upwardly and extended forwardly and curved at their front ends to contact with the ends of the rods 16. Each of the rods 16 is provided at its outer end with a coil-spring 25, the outer ends of which bear against the sides of the boxes 12, while their inner ends bear against the outer ends of the flat sides 18.

26 and 27 indicate shafts mounted in bearings of the parallel bars 3, respectively at the front and rear, and upon these shafts are mounted sprocket-wheels 28 and 29, around which passes a sprocket-chain 30. At equidistant points along the chain 30 are arranged transverse spreaders 31, having their ends 32 rounded by bending to adapt them to pass between and spread apart the springs 23, thus forcing the rods 16 outwardly, said rods being retracted after the passage of the spreader by the coil-springs 25. A guard-loop 33, provided with a guide-arm 33×, spans the space through which the springs 23 move to prevent undue spreading of said springs.

Upon the axle 8 is mounted a sprocket-wheel 34, connected by a chain 35 with a sprocket-pinion 36, mounted on the shaft 27, concentric with the sprocket-wheel 29 thereon. The sprocket-wheel 34 has an integral clutch-section 37, coöperating with a sliding clutch-section 38, provided with a forked lever 39, extending within easy reach of the driver, to throw the sprocket devices into and out of gear, as will be readily understood.

It will be apparent that the revolution of the axle 8 will convey motion through the described gearing to the endless chain 30, carrying the spreaders, and that the contact of the latter with the springs 23 will intermittently operate the slides to permit corn to be dropped from the boxes 12.

I will now describe the automatic marking mechanism which I employ in combination with the usual reversible marker 40, secured to the end of a bar 41, pivoted upon a pin 42, supported between the arched bar 43, arranged parallel to the bar 24 upon the bars 3. Depending from the under sides of the bars 3 are a pair of brackets 44, formed with bearings at their lower ends for a cross-pin 45, upon which is pivotally secured a lever 46, provided with a bearing 47 to receive the pin 45. The upper end of the lever 46 is provided with a cross-head 48, adapted to be struck by the spreaders 31, as will be further explained. Projecting laterally from the lever 46, near its upper end, are arms 49, to which are secured the lower ends of four divergent coil-springs 50, the upper ends of said springs being secured, respectively, to the frame-bars 3.

To the lower end of the lever 46 is secured a marker-bar 51, consisting, preferably, of a flat bar twisted at the point 52 and terminating in a hooked outer end 53, adapted to indent and thus mark the ground at a point alining vertically with the corn-boxes 12.

The operation of the marker is as follows: The spreaders 31 are so arranged upon the chain 30 that as the rods 16 are operated by one of the spreaders, on the upper side of the chain, to drop the corn the cross-head of the lever 46 will be simultaneously struck by another of the spreaders, on the under side of the chain, on its return or backward movement. The lower end of the lever is thus thrown upward, and as the marker 51 projects from the lever at an angle it will be partially turned against the tension of the forward pair of springs 50, and after the passage of the spreader the marker, by the force of the rearward pair of springs 50, is quickly retracted, so that its hooked outer end strikes the ground sharply to make a mark.

The operation of the machine is positive and automatic. The clutch mechanism enables the driver to throw the operating parts out of gear when it is desired to move the machine from one place to another.

Having thus fully described my invention, what I claim as new, and desire to secure by Letters Patent, is—

1. The combination with the machine-frame of a depending bracket secured thereto, a lever 46 having a contact portion adapted to be struck by traveling strikers, springs for supporting and retracting said lever, and a marker-bar 51 secured to said lever, substantially as set forth.

2. The combination with the depending tilting lever 46 of a marker-bar 51 secured to said lever, twisted at the point 52 and provided with a hooked outer end 53, substantially as set forth.

3. The combination with the rods 16 and their operating-springs of the endless chain and spreaders, the marking-bar 51 and its lever 46, said lever being arranged to be struck by one of the under, rearwardly-moving spreaders, as the rods 16 are operated by another of the spreaders traveling toward the front of the machine on the upper side of the chain, substantially as set forth.

In testimony whereof I have signed this specification in the presence of two subscribing witnesses.

WILLIAM S. EYSTER.

Witnesses:
FELIX MADER,
JASON F. RICHARDSON, Jr.